(12) United States Patent
Valle et al.

(10) Patent No.: US 9,310,631 B1
(45) Date of Patent: Apr. 12, 2016

(54) ACOUSTIC ABSORBER HAVING A ROUGHENED SURFACE FOR AO DEVICES

(71) Applicant: Gooch and Housego PLC, Ilminster, Somerset (GB)

(72) Inventors: Stefano Valle, Ilminster (GB); Christopher N. Pannell, Orlando, FL (US); Jonathan David Ward, Ilminster (GB)

(73) Assignee: Gooch and Housego PLC, Somerset (GB)

( * ) Notice: Subject to any disclaimer, the term of this patent is extended or adjusted under 35 U.S.C. 154(b) by 16 days.

(21) Appl. No.: 14/507,931

(22) Filed: Oct. 7, 2014

(51) Int. Cl.
*G02F 1/11* (2006.01)
*G02B 6/26* (2006.01)

(52) U.S. Cl.
CPC . *G02F 1/11* (2013.01); *G02B 6/262* (2013.01)

(58) Field of Classification Search
CPC .......... G02F 1/11; G02F 1/116; G02F 1/332; H01S 3/1068; G01J 3/1256
USPC ......... 359/285–287, 298, 305, 308, 311–314; 372/9, 13, 20
See application file for complete search history.

(56) References Cited

U.S. PATENT DOCUMENTS

| | | | |
|---|---|---|---|
| 4,330,728 | A | 5/1982 | Solie |
| 4,598,261 | A | 7/1986 | Ballato |
| 4,767,198 | A | 8/1988 | Solie et al. |
| 6,127,768 | A | 10/2000 | Stoner et al. |
| 7,684,110 | B2 | 3/2010 | Pannell et al. |
| 8,679,874 | B2 | 3/2014 | Yao et al. |
| 2005/0194205 | A1 | 9/2005 | Guo |

FOREIGN PATENT DOCUMENTS

| | | |
|---|---|---|
| GB | 2183359 A | 6/1987 |
| JP | H11352529 A | 12/1999 |

*Primary Examiner* — Mahidere Sahle
(74) *Attorney, Agent, or Firm* — Jetter & Associates, P.A.

(57) ABSTRACT

An acousto-optic (AO) device includes an AO crystal having a plurality of faces including a first face and a second face. An input transducer bonded to the first face (top electrode) for receiving a radio frequency (RF) signal and launching bulk acoustic waves (BAWs) configured to interact with an optical beam propagating in the AO crystal, wherein the BAWs are received at least in part by the second face after interacting with the optical beam. The second face has a roughened surface portion over an area of at least (≥) 50% of an area of the top electrode, and a root mean square (rms) surface roughness≥1 μm and a surface profile derivable from a Fourier transform which provides at least one a first spatial frequency peak from 1 cycle/mm to 300 cycles/mm or at least one band of spatial frequency peaks from 1 cycle/mm to 300 cycles/mm.

20 Claims, 12 Drawing Sheets

ACOUSTIC ABSORBER HAVING A ROUGHENED SURFACE FOR AO DEVICES

FIELD

Disclosed embodiments relate to acoustic absorbers for acousto-optic (AO) devices.

BACKGROUND

In a variety of AO devices, such as acousto-optic tunable filters (AOTFs), AO modulators, AO Q-switches, deflectors and AO frequency-shifters, a transducer having an electrode thereon (generally referred to as a "top electrode") on a face of an AO crystal receives a radio frequency (RF) electrical drive signal that results in emanating a forward acoustic wave into the AO crystal that is directed to interact with an optical beam to be processed by the AO device. The AO crystal is conventionally optically smooth on all of its faces, with one approximate criterion for smoothness being the Rayleigh criterion, where a surface is generally considered to be optically smooth if d<λ/(8 cos θ), where d is the surface roughness (e.g., root-mean-square roughness (rms) height measured from a reference plane), λ is being the wavelength of the incidence, and θ being the angle of incidence of the illumination beam. A typical rms roughness for an optically smooth surface for an AO device is generally 10 nanometers, or less.

The acoustic wave after interaction with the optical beam is typically absorbed by an acoustic absorber (or "beam dump"), such as an epoxy layer filled with silver particles, that is typically on the face of the AO crystal substantially opposite the transducer positioned to receive the acoustic beam after its interaction with the optical beam. The acoustic absorber helps prevent backward (180 degree) travelling acoustic waves from also interacting with the optical beam. As known in the art, backward travelling acoustic waves cause problems by Doppler shifting the frequency of the optical beam in the opposite direction relative to the forward acoustic wave Doppler shift of the frequency of the optical beam, which results in the filtered optical beam at the output of the AO device having undesired harmonics of the fundamental frequency of the unfiltered optical beam. The reflected acoustic waves can also cause problems where the AO device is designed to produce a periodic and controllable loss, such as such as when used as a Q-switching element inside a laser cavity. In this case, echoes can cause unwanted bursts of loss to occur after the main burst, and this can lead to a malfunction of the laser system.

The acoustic absorber is known to increase in temperature during operation of the AO device as the acoustic absorber absorbs energy from the arriving acoustic wave. The heating of the acoustic absorber can result in significant heating of the AO crystal particularly for applications that utilize relatively high RF power per unit area of the active transducer.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments include acoustic absorbers and acousto-optic (AO) devices therefrom having roughened surfaces with surface features on at least the face of the AO device receiving the acoustic wave after interacting with the optical beam referred to as the "second face", which may be contrasted with conventionally optically smooth faces for beam dumping having an epoxy layer filled with metal particles. Disclosed roughened surfaces can be used on all crystal faces except the optical faces and the transducer face, which can further increase the dumping efficiency of acoustic waves in AO devices.

The second face has a roughened surface portion over an area of at least (≥) 50% of an area of the top electrode and a root mean square (rms) surface roughness of at least (≥) 1 μm, and a surface profile derivable from a Fourier transform which provides at least a first spatial frequency peak from 1 cycle/mm to 300 cycles/mm or at least one band of spatial frequency peaks from 1 cycle/mm to 300 cycles/mm. When the bulk acoustic wave (BAW) wavelength substantially matches the feature periodicity it has been found to largely suppress unwanted backward (180 degree) acoustic reflections. As used herein, the BAW wavelength "substantially matching" the feature periodicity refers to the spatial frequency peak(s) when expressed as a feature period(s) being from 0.5 to 2.0 times the BAW wavelength. For an example single fixed 80 μm applied RF signal to the transducer bonded to a $TeO_2$ AO crystal that results in about a 50 μm BAW wavelength in the $TeO_2$ crystal, the substantially matching feature periodicity representing a phase matching condition would be from 25 μm to 100 μm.

In one embodiment, the roughened surface has a plurality of feature periodicities. In this embodiment, due to a plurality of feature periodicities, for incident BAWs on the roughened surface, it is recognized although BAWs are generally coupled in to surface-localized waves or are scattered over a relatively large solid angle in a less efficient way as compared to a surface having single feature periodicity, the suppression of back reflection has been found to be able to be achieved for a range of acoustic frequencies which can all satisfy the phase matching condition. This provides back reflection suppressor that is operable over a range of frequencies for AO device applications that operate over a range of frequencies.

Disclosed embodiments include AO devices including an AO crystal having a plurality of faces including a first face and a second face. An input transducer has an electrode bonded to the first face (top electrode) for receiving a radio frequency (RF) signal and launching BAWs into the AO crystal configured to interact with an optical beam propagating in the AO crystal. The first face will also contain a metalized ground plane which will form one electrical contact for the purpose of exciting BAWs by application of the RF power. The top electrode defines the active area of the acoustic beam, i.e. the acoustic beam transverse dimensions are determined by the top electrode dimensions, and by any subsequent diffractive spreading that occurs as the BAW propagates through the AO crystal.

BRIEF DESCRIPTION OF THE DRAWINGS

Reference will now be made to the accompanying drawings, which are not necessarily drawn to scale, wherein.

DETAILED DESCRIPTION

Figure 1A:
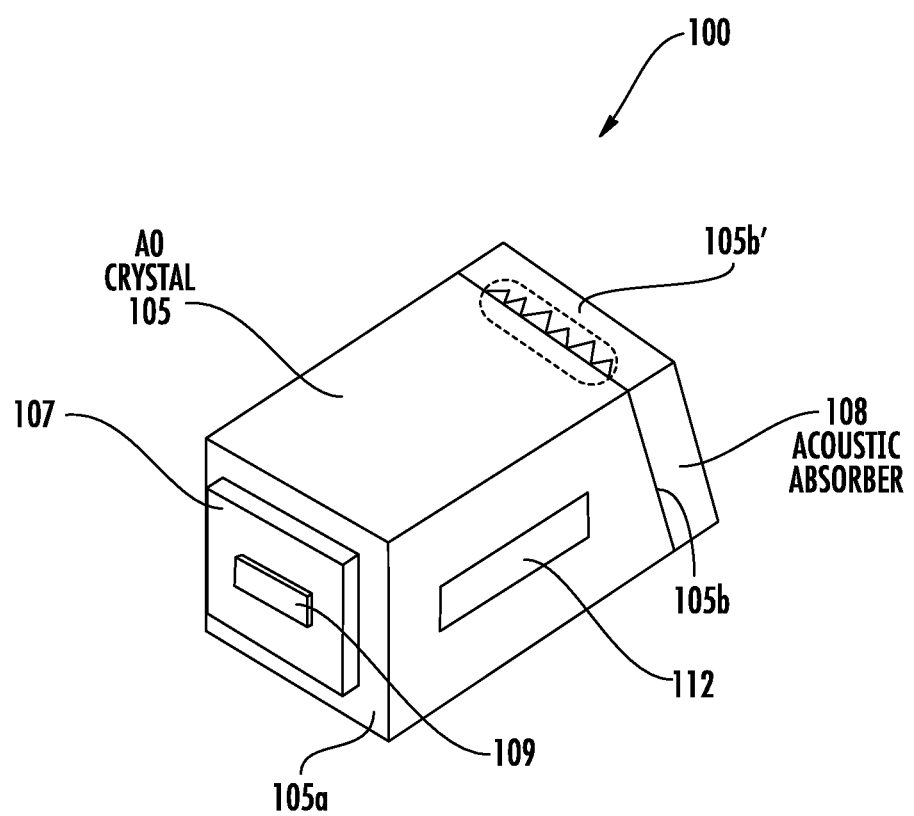
FIG. 1A is a simplified schematic of an AO modulator (AOM) with a transducer having a top electrode on a first crystal face having a second crystal face shown as an opposite face that has a disclosed roughened surface portion for suppression of backward acoustic reflections, according to an example embodiment.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

Notwithstanding that the numerical ranges and parameters setting forth the broad scope of this Disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

Disclosed embodiments recognize suppression of backward acoustic reflections by acoustic beam dumping for an AO device can be obtained or enhanced by the presence of a roughened surface having roughness imparting features to provide a surface roughness to generate BAW to surface-localized wave conversion and an increase in diffuse reflection or otherwise preventing back reflection. The rms roughness is at least 1 µm, and a surface profile derivable from a Fourier transform provides at least a first spatial frequency peak from 1 cycle/mm to 300 cycles/mm or at least one band of spatial frequency peaks from 1 cycle/mm to 300 cycles/mm. When the BAW wavelength substantially matches the feature periodicity it has been found to largely suppress unwanted backward (180 degree) acoustic reflections, which as described above is defined as a feature periodicity having spatial frequency peak(s) when expressed as a feature period(s) being from 0.5 to 2.0 times the BAW wavelength.

FIG. 1A is a simplified schematic of an AOM 100 with a transducer 107 bonded to a first AO crystal face 105a of an AO interaction crystal (AO crystal) 105, according to an example embodiment, with a top-electrode 109 on a portion of the surface of the transducer 107. The AO crystal 105 has a second face 105b shown as an opposite face having a disclosed roughened surface portion 105b'. The second face 105b need not be an opposite face. Although the roughened surface portion 105b' is shown on only a portion of the area of second face 105b, the roughened surface portion 105b' can be provided throughout the full area of the second face 105b.

As noted above the roughened surface portion 105b' of the second face 105b is over an area of at least (≥) 50% of an area of the top electrode 109, typically over an area that is ≥the area of the top electrode 109, and has an rms surface roughness≥1 µm. and a surface profile derivable from a Fourier transform or other suitable frequency separation algorithm, which includes at least a first spatial frequency from 1 cycle/mm to 300 cycles/mm or at least one band of spatial frequencies from 1 cycle/mm to 300 cycles/mm.

Roughened surface portion 105b' functions by suppression of backward acoustic reflections by mechanisms believed to be operative including conversion of incident BAWs received to surface-localized waves which then spread laterally along the surface of the roughened surface portion 105b' to act as a hot spot spreader as well as scattering over a large solid angle (e.g., >60 degrees e.g., a cone of half angle>30 degrees. However, although the mechanisms described herein are believed to be accurate, disclosed embodiments may be practiced independent of the particular mechanism(s) that may actually be operable.

Second face 105b is shown including an acoustic absorber layer 108 thereon including over the roughened surface portion 105b', such as silver filled epoxy one particular embodiment. The acoustic absorber layer 108 shown in FIG. 1A may not be needed when the roughened surface portion 105b' provides a desired level of BAW conversion to surface-localized wave and resulting hot spot spreading.

The AO crystal 105 comprises an AO interaction material, for example, quartz or TeO$_2$. The transducer's 107 thickness is generally chosen to match the acoustic frequency to be generated which is typically 1 μm to 100 μm. The incident optical beam enters the clear aperture 112, which can be anti-reflective (AR) coated.

Fiber-coupled AO modulators can be small-size AO modulators with a fiber coupled input and output that use a small area transducer and relatively high RF power per unit area of transducer. Such AOMs are commonly used in "pulsed" mode and are specified to have a fast rise time, typically a few nanoseconds. This is recognized to lead to cracking problems of the AO crystal 105 where the acoustic beam impinges on the face of the AO crystal functioning as the acoustic beam dump, and it is believed this to be caused by the high-power short pulses arrive at the opposite face, causing a combination of mechanical shock and localized heating. Spreading the acoustic energy received out laterally by mechanisms including conversion from BAWs to surface-localized wave-like modes and diffuse reflection/scattering has been found to help reduce the mechanical shock and localized heating. More generally, this technique is expected to be useful for any AO device which can benefit from spreading the hot spot caused by the acoustic beam arriving at the beam dump out laterally.

Figure 1B:
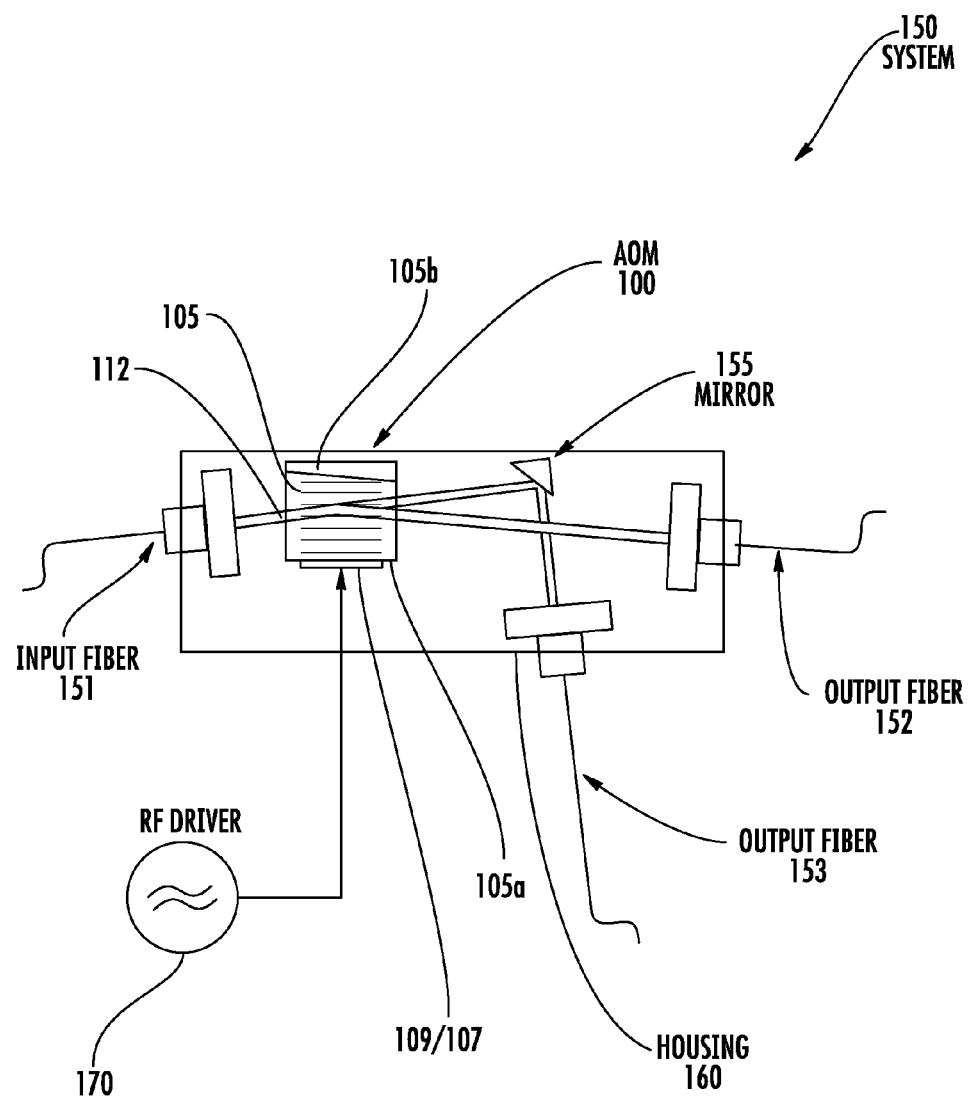
FIG. 1B is a depiction of a fiber-coupled AOM system including the AOM shown in FIG. 1A.

FIG. 1B is a depiction of an example fiber-coupled AOM system (AO system) 150 including the AOM 100 shown in FIG. 1A. AOM system 150 includes a housing 160 with an input fiber 151 for coupling in the input beam and an output fiber 152 which receives the first order diffracted beam. An optional other (second) output fiber 153 is shown for receiving the undiffracted (zero order) beam after reflection by the mirror 155 shown. A RF driver 170 drives the transducer 107 shown with its top electrode as 109/107. For known absorbing structures on conventional optical faces of the AO crystal 105, as described above, relatively high RF power applied to the transducer 107 can cause excessive heating of the second face 105*b* where beam dumping takes place that can result in a significant temperature rise of the AO crystal 105, which can measurably alter its optical properties and in some cases cause cracking of the AO crystal 105.

This unwanted heating effect can include the formation of a refractive index gradient in the AO crystal 105, which can tend to steer and distort the output optical beam. If the objective for AO system 150 is to launch the output beam into the output fiber 152 being a single mode optical fiber, these effects can adversely affect the efficiency with which the light couples into the core of the output fiber 152. This will undesirably contribute to further reductions in overall efficiency of the AO system 150.

Figure 1C:
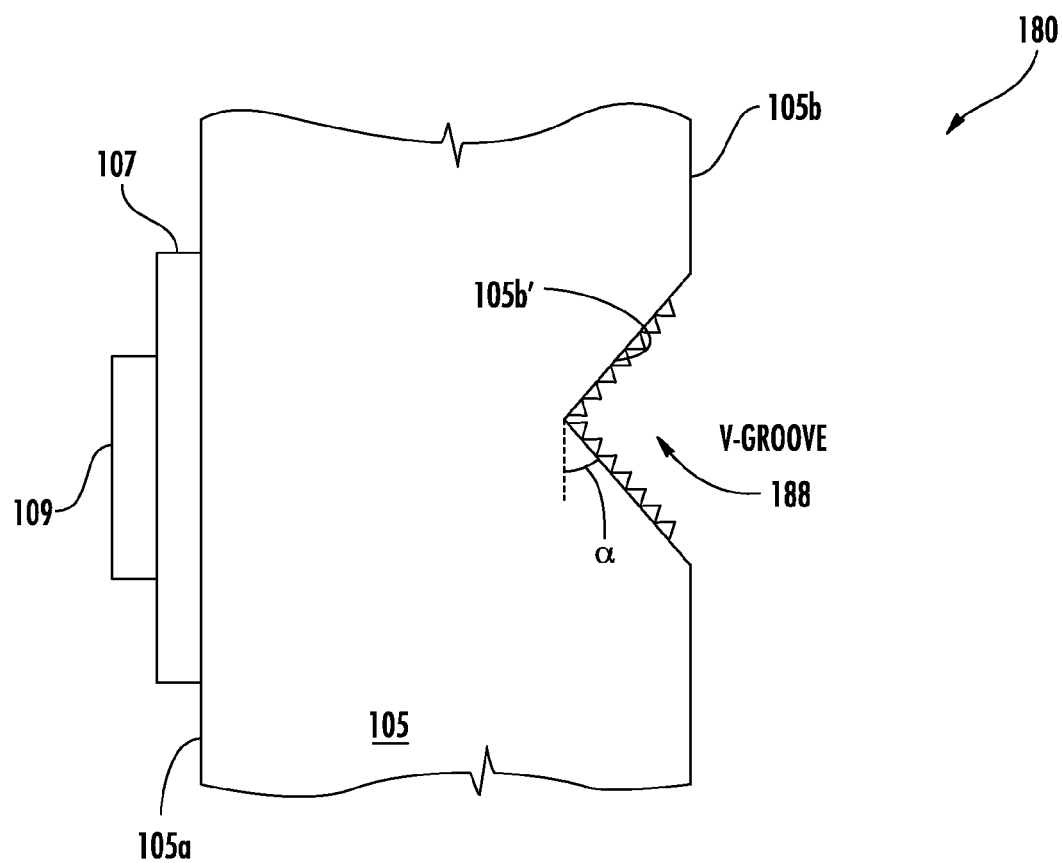
FIG. 1C is a simplified schematic of a germanium acousto-optic deflector (AOD) with a transducer having a top electrode on a first crystal face having a second crystal face shown as an opposite face having a V-groove that has a disclosed roughened surface portion for suppression of backward acoustic reflections, according to an example embodiment.

In the infrared region of the spectrum, germanium is the only commercially available acousto-optic modulator or deflector material with a relatively high figure of merit. However, germanium exhibits a very large Dn/DT meaning temperature gradients needs to be minimized to avoid beam steering and thermal lensing. Disclosed embodiments apply to germanium devices and can help reduce RF heating effects. FIG. 1C is a simplified schematic of a germanium AOD 180 with a transducer 107 having a top electrode 109 on a first crystal face 105*a* having a second face 105*b* shown as an opposite face having a V-groove 188 that has a disclosed roughened surface portion 105*b*' for suppression of backward acoustic reflections, according to an example embodiment. In this embodiment the AO crystal 105 is a germanium crystal. The surface in the V-groove 188 region can be roughened using a 1D (linear) lapping technique described below, or roughened by other suitable techniques.

Figure 2A:
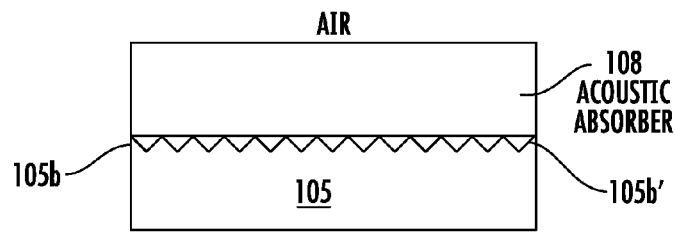
FIG. 2A is a cross sectional depiction of a disclosed roughened surface portion of an AO crystal with an acoustic absorber layer on the roughened surface portion, according to an example embodiment.

FIG. 2A is a cross sectional depiction of a disclosed roughened surface 105*b* of an AO crystal 105 with an acoustic absorber layer 108 on the roughened surface portion 105*b*' of a second face 105*b*, according to an example embodiment. An emery pad or lapping pad (hereafter a "lapping pad") having a primary particle size, such as about 40 μm in one particular embodiment, can be used with a lapping apparatus for texturing to form the roughened surface portion 105*b*'. Lapping pads are known to typically be pieces of cardboard which have abrasive particles glued thereto. Usually lapping with a lapping board is performed using a grit in the form of particles of graded size, placed on a suitable plate (the "lapping plate") with a liquid such as water to form a slurry. The presence of an acoustic absorber layer 108 tends to dissipate part of the acoustic energy on the second face 105. As described below for a 9 μm grit finished surface the presence of an acoustic absorber layer 108 being silver loaded epoxy absorbs a part of incident acoustic wave for a 50 μm wavelength acoustic wave, but the number of echoes is not largely reduced (see FIG. 3D) as compared to the case of a 40 μm grit finished surface without the acoustic absorber layer 108 shown in FIG. 3B that absorbs a larger part of incident acoustic wave for a 50 μm acoustic wave.

The presence of a quasi-random structure that can be provided in one embodiment by a disclosed a roughened surface portion 105*b*' is believed to tend to increase the acoustic intensity attenuation because the part or the energy from the arriving BAWs, which is not converted on surface-localized wave, may propagate inside the acoustic absorber layer 108 where acoustic loss is higher. When the BAWs are reflected backwards by the free boundary between the acoustic absorber layer 108 and air, the BAWs can be converted into surface-localized wave by the quasi-periodic structure provided by the roughened surface portion 105*b*' at the interface between the acoustic absorber layer 108 and the second face 105*b* of the AO crystal 105. Accordingly, the overall attenuation of the reflected acoustic wave inside of the AO crystal 105 is generally higher as compared to known attenuation techniques. This increase in attenuation was confirmed by thermal imaging performed.

Figure 2B:
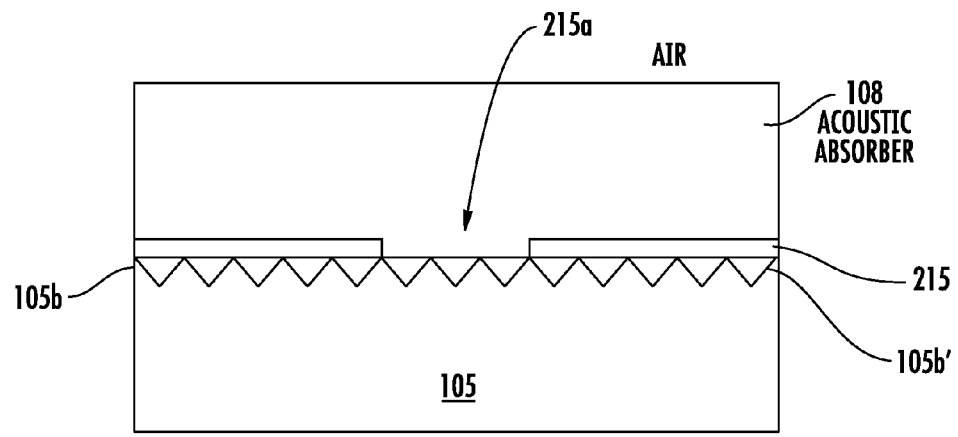
FIG. 2B is a cross sectional depiction of a disclosed roughened surface portion of a second face of an AO crystal with an intervening layer including an aperture between an acoustic absorber layer and the roughened surface portion, according to an example embodiment.

FIG. 2B is a depiction of a disclosed roughened surface of an AO crystal 105 with an intervening layer 215 having an aperture 215*a* positioned to be in the path of the acoustic beam provided between an acoustic absorber layer 108 and the roughened surface portion 105*b*' of a second face 105*b*, according to an example embodiment. Intervening layer 215 function as an additional layer which improves the efficiency of the acoustic dump. The efficiency of acoustic wave dumping may depend on the matching of acoustic impedance between AO crystal 105 and acoustic absorber layer 108, but the scattered acoustic wave by the particles inside of the acoustic absorber 108, such as by silver particles in epoxy, can pass through the interface between the acoustic absorber layer 108 and AO crystal 105. Such a spurious acoustic wave can propagate inside the AO crystal 105. The intervening layer 215 is a thermally conductive layer, defined herein to have a 25° C. thermal conductivity of ≥50 W/m·K, such as a metal layer, which is generally about 0.2 mm to 5 mm thick.

The attenuation of such spurious acoustic waves generated inside the acoustic absorber layer 108 can be increased by the intervening layer 215 which can increase the acoustic impedance mismatch between the acoustic absorber layer 108 and AO crystal 105 materials, so that spurious acoustic waves remain confined inside the acoustic absorber layer 108. The intervening layer 215 can be simply be added as there is no need for any bond between the AO crystal 105 and the intervening layer 215. With the presence of the roughened surface portion 105b' and the intervening layer 215, the acoustic absorber layer 108 shown may be omitted.

A variety of methods can be used to form disclosed roughened surface portions 105b' including lapping using a lapping pad providing an abrasive grit. As used herein, the size of the grit refers to the average size (dimension) of the abrasive particles of the lapping pad. Qualitatively, it has been found an increase in grit size results in an increase in resulting roughness and a decrease in the spatial frequency (=increase in feature periodicity) and a decrease in grit size results in a decrease in resulting roughness and an increase in the spatial frequency (=decrease in feature periodicity). For lapping pads, using linear polishing, the average particle size of the grit results in a feature periodicity close to the average particle size of the grit, and strong BAW to surface-localized wave conversion at the roughened surface has been found to occur when the acoustic wavelength substantially matches the feature periodicity.

However, other methods may be used to form disclosed roughened surface portions 105b' including lithography using a suitable mask pattern then etching, such as reactive ion etching (RIE), plasma etching or wet etching. Wet etching can comprise using HF for quartz, for example.

Disclosed crystal faces having roughened surface portions can benefit a variety of AO devices. For example, there are AO devices used as continuous wave modulators for providing a frequency shift to help in optical signal processing in their equipment. Such devices are generally demanding, being highly sensitive to spurious acoustic waves, partially reflected waves etc., as a reflected wave will give rise to a shifted frequency of the opposite sign to the intended one or even multiples of the original frequency shift in some cases.

Such frequency-shift based AOM devices typically operate at a single predetermined acoustic frequency and can thus include a disclosed roughened surface portion 105b' over an area of at least (≥) 50% of the area of the top electrode including with roughness feature on the surface providing a rms roughness of ≥1 μm. A deterministic periodic structure can be provided with at least one spatial frequency principal peak in the range from 1 cycle/mm to 300 cycles/mm that is at least two (2) times higher in amplitude as compared to all other peaks in this range designed for the principal peak to satisfy the phase matching condition for the single predetermined acoustic frequency. Alternatively, a deterministic aperiodic structure can be used which includes at least one sub-band at least 3 cycles/mm in width within the band from 1 cycle/mm to 300 cycles/mm including a plurality of different spatial frequencies peaks which each have an amplitude at least two (2) times higher amplitude as compared to all other peaks in one or more continuous bands having a of spatial frequency in the range from 1 cycle/mm to 300 cycles/mm, where the band(s) include the single predetermined acoustic frequency.

Some AO devices can benefit from a second face having an rms roughness of ≥1 μm, with the surface designed to have a feature periodicity to provide the above-described phase matching condition for the BAWs utilized. For example, an acousto-optic tunable filter (AOTF) is generally used as an optical filter for filtering a broadband beam from a broad band optical source thus using a range of acoustic frequencies. AOTFs having disclosed optical faces having roughened surface portions providing a quasi-periodic structure can also prove useful as the roughened surface portion 105b' can help reduce the reflected acoustic wave to lower levels than the levels currently achieved. This is evidenced by the pulse-echo measurements shown in FIG. 3A described below.

Disclosed embodiments also include methods of surface texturing. The method can comprise calculating a minimum rms roughness based on a wavelengths of BAWs to be used in operating an AO device. The second face is textured so that the second face has a roughened surface portion over an area of at least (≥) 50% of an area of the top electrode, and a rms surface roughness≥1 μm and a surface profile derivable from a Fourier transform which provides at least a first spatial frequency being from 1 cycle/mm to 300 cycles/mm or at least one band of spatial frequencies from 1 cycle/mm to 300 cycles/mm including the first spatial frequency. The Examples section include a sample calculation of spatial frequency for a particular application scenario.

The texturing can comprise a variety of machining operations. Machining is defined as a mechanical process of removing material from a workpiece. To perform the machining operation, relative motion is introduced between the machining tool and the workpiece. This relative motion is achieved in most machining operations by a primary motion, referred to as cutting speed and a secondary motion, called feed. The shape of the tool and its penetration into the workpiece surface, combined with these motions, produce the desired shape of the features on the resulting workpiece surface.

Common machining operations, such as drilling, turning, milling, and grinding, are capable of generating desired geometries and surface textures. For example, a turning operation uses a cutting tool to remove material from a rotating workpiece to generate a cylindrical shape. As another example, grinding, which is generally highest precision machining process, can generate a given surface topography with fine tolerances. Reactive ion etching (RIE) or chemical etching ("wet etching") can also be used, where the desired pattern is defined photolithographically on the surface to be etched using a suitable mask.

In particular, grinding (also known as lapping) involves removing materials by creating a contact between a grinding wheel having an abrasive surface and a workpiece. Each particle grain on the grinding wheels surface removes a chip from the surface of the workpiece material and generates a surface finish. Material removal is done by individual grains whose cutting edge is bounded by force and path.

The moving during grinding can involve a usually randomized 2-dimensional (2D) motion. In another embodiment, the moving can consist of 1-dimensional (1D) (reciprocating) movement. A 1D lapping procedure has been found to unexpectedly provide more control over the resulting roughness spectrum as compared to 2D movement (e.g., see FIG. 8 described below). A 1D pattern rather than 2D has been found to not be a disadvantage, as usually for AO devices the AO interaction is confined to a plane and the grinding is performed in a plane perpendicular to this so as to generate roughness in the interaction plane. Longitudinal grinding will generate little roughness along the direction of lapping, but as this will be orthogonal to the interaction plane, this being recognized to generally not matter.

EXAMPLES

Disclosed embodiments are further illustrated by the following specific Examples, which should not be construed as limiting the scope or content of this Disclosure in any way.

A series of experiments were performed where 8 AOM cells were prepared starting from AOM cells resembling AOM 100 shown in FIG. 1A realized on a $TeO_2$ crystal using a lapping technique with a lapping pad having an average grit size to provide a disclosed roughened surface on the second face. Second face surfaces were generated using the conventional lapping technique in which the AO crystal was allowed to rotate around on a flat lapping plate and held in no particular orientation where a 1D motion was used unless otherwise noted.

The acoustic wedge was removed to obtain parallel faces between the transducer face and its opposite second face, so that a pulse-echo apparatus could be used to measure acoustical echoes at the second face. The second face of different AO devices was reworked (machined/lapped) using a lapping pad with 9 µm, 12 µm, 20 µm and 40 µm approximate particle dimensions (grit size), which have been found to create different "quasi-random" surface features with a different roughness.

An acoustic absorber comprising an epoxy loaded with silver particles was added on the second faces to 4 AOM cells, to compare the combined effect between different disclosed quasi-random surface structures and the presence of an acoustic absorber. Four AOM cells were tested, two cells having second faces processed with a 9 µm grit lapping pad with and without an acoustic absorber comprising silver filled epoxy, and two cells with a 40 µm lapping pad finishing. Tested conditions were 80 MHz RF and 1 W of RF power. A higher RF drive frequency corresponds to a smaller BAW wavelength. From the pulse echo apparatus it was possible to compare the effect of surface quality (and the acoustic absorber layer) on the reflected acoustic wave. Data taken showed the effect of quality surface without an acoustic absorber. As described below, the effectiveness of back reflection prevention from mode conversion to surface localized waves was found to change with acoustic frequency.

Figure 3A:
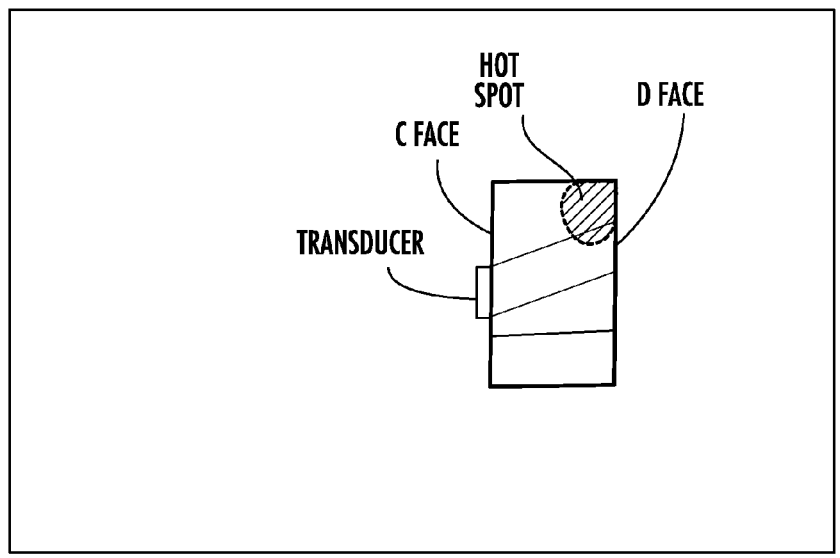
FIG. 3A is a thermal camera depiction of an AO crystal with a transducer that was surface (worked) lapped with 40 µm lapping under applied RF power pad, which is confirmed by the pulse echo measurement shown in FIG. 3B which shows signal amplitude as a function of time obtained from pulse echoes from an example AO cell having the 40 µm lapping pad processing. There are only two echoes shown (and thus a low level of reflection) which evidences efficient BAW to surface-localized wave conversion by the roughened surface.
Figure 3B:
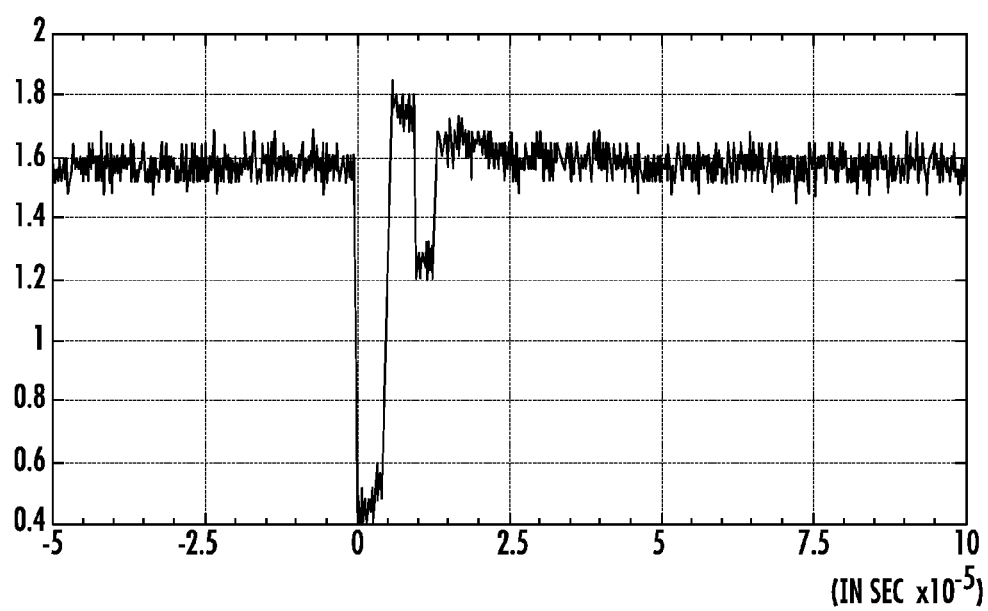
FIG. 3C is a thermal camera depiction of an AO crystal with a transducer surface lapped with a 9 µm lapping pad under applied RF power. The hotspot is against the transducer and the BAW is reflected in backward direction. This thermal measurement is confirmed by the pulse echo measurement shown in FIG. 3D.

FIG. 3A is a thermal camera depiction of an AO crystal with a transducer surface worked with a 40 µm lapping pad under applied RF power. One would expect to see an increasing of the average temperature of the cell, but thermal camera image revealed a different thermal pattern. In this case, the image depiction in FIG. 3A evidences conversion from BAW to surface-localized waves is occurring, and that these surface-localized modes are being primarily absorbed in the top right corner, shown by the upper right "hot spot". The thermal measurement is confirmed by the pulse echo measurement shown in FIG. 3B which shows signal amplitude as a function of time (in seconds×$10^{-5}$) obtained from pulse echoes from an example AO cell having 40 µm lapping pad surface finishing. There are only two echoes shown (and thus a low level of reflection) which evidences efficient BAW to surface-localized wave conversion by the roughened surface.

Figure 3C:
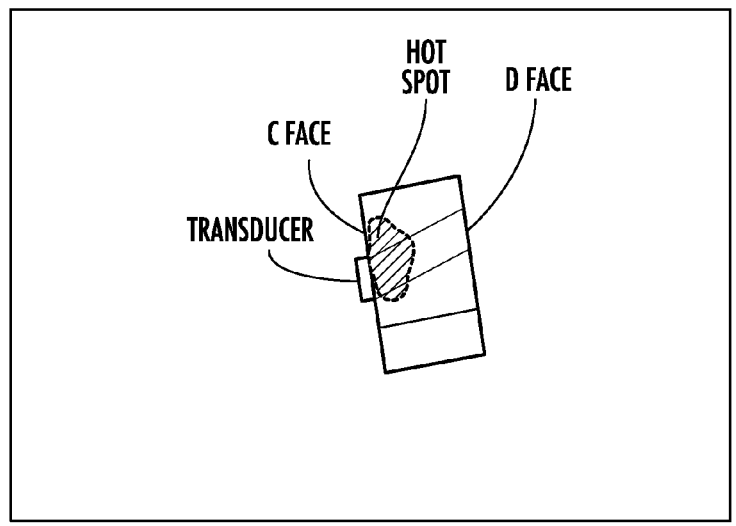
Figure 3D:
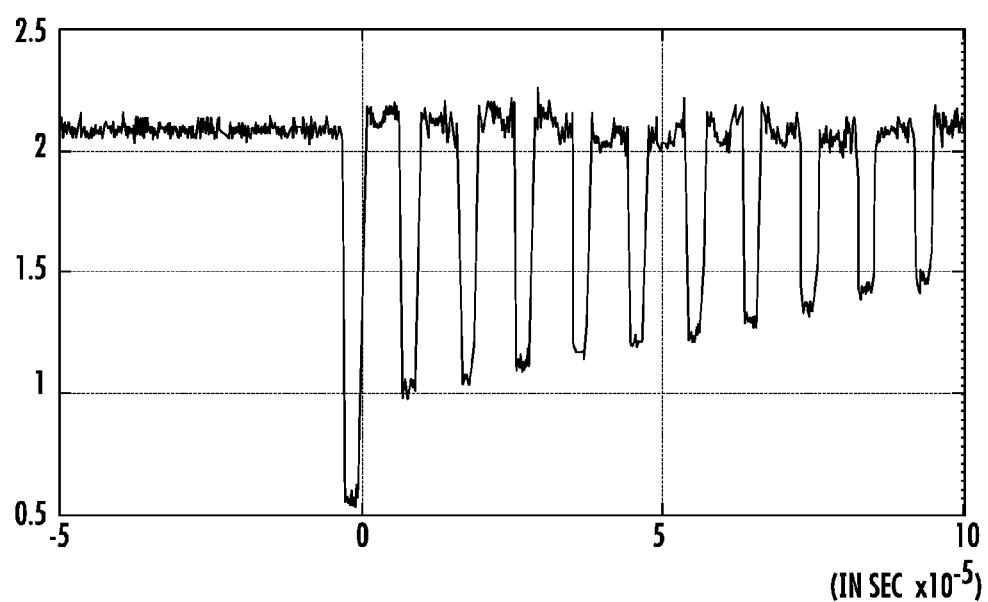

FIG. 3C is a thermal camera depiction of an AO crystal with a transducer surface worked with a 9 µm lapping pad under applied RF power. The hotspot is against the transducer and the BAW is reflected in backward direction. This thermal measurement is confirmed by the pulse echo measurement shown in FIG. 3D which shows the 9 µm lapping pad surface finishing results in about 10 echoes, which is only slightly improved in performance as compared to a conventional optically flat surface.

The effect shown in FIGS. 3A and 3C can be described by a mode conversion mechanism, which takes place when a BAW hits a disclosed roughened surface having a periodic or Quasi-periodic structure. The mode conversion process converts BAW into surface-localized wave (periodic structure) or surface-localized wave (Quasi-periodic structure) when the acoustic wavelength substantially match the feature periodicity on the surface. The BAW wavelength changes with the frequency therefore there is a frequency range where the mode conversion process from BAW to surface-localized wave is highly efficient. Surface-localized waves are acoustic wave travelling parallel to the surface, but when a surface-localized wave travels along a surface with a quasi-periodic structure, if the acoustic wavelength substantially matches the periodicity then a mode conversion from surface-localized wave to BAW takes place, and the acoustic wave is launched perpendicular to the surface.

Figure 4:
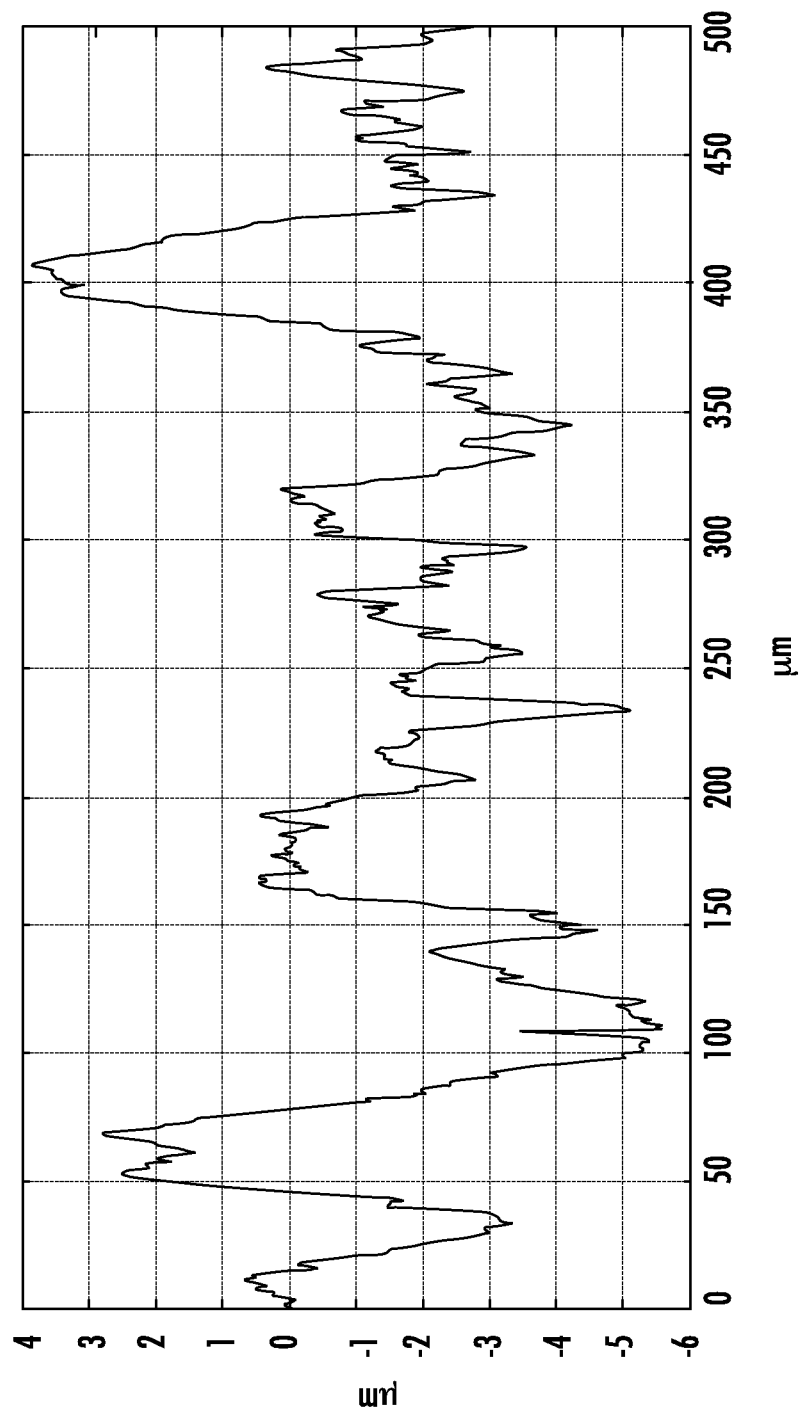
FIG. 4 shows a roughness plot of an example $TeO_2$ crystal after 40 µm lapping pad processing, according to an example embodiment.

FIG. 4 shows a roughness plot of an example $TeO_2$ crystal after 40 µm lapping pad finishing, according to an example embodiment.

A sample spatial frequency design guideline for a particular application scenario is now described. For an example "Fiber-Q" device made from a $TeO_2$ substrate, typically the operating (RF) frequency would be about 80 MHz, leading to a BAW wavelength as noted above of about 50 µm, with the particular acoustic wavelength value depending on orientation of the cell. In this case roughening of the surface opposite the transducer in order to efficiently suppress back reflections of the acoustic wave involves a feature generation process, such as the 1D lapping process described above, to generate roughness features in the face opposite the transducer having characteristic sizes to provide a periodicity having at least a first spatial frequency peak when expressed as a feature period being from 0.5 to 2.0 times said BAW wavelength, that for a BAW wavelength of 50 µm equates to a feature period of 25 µm to 100 µm.

Figure 5:
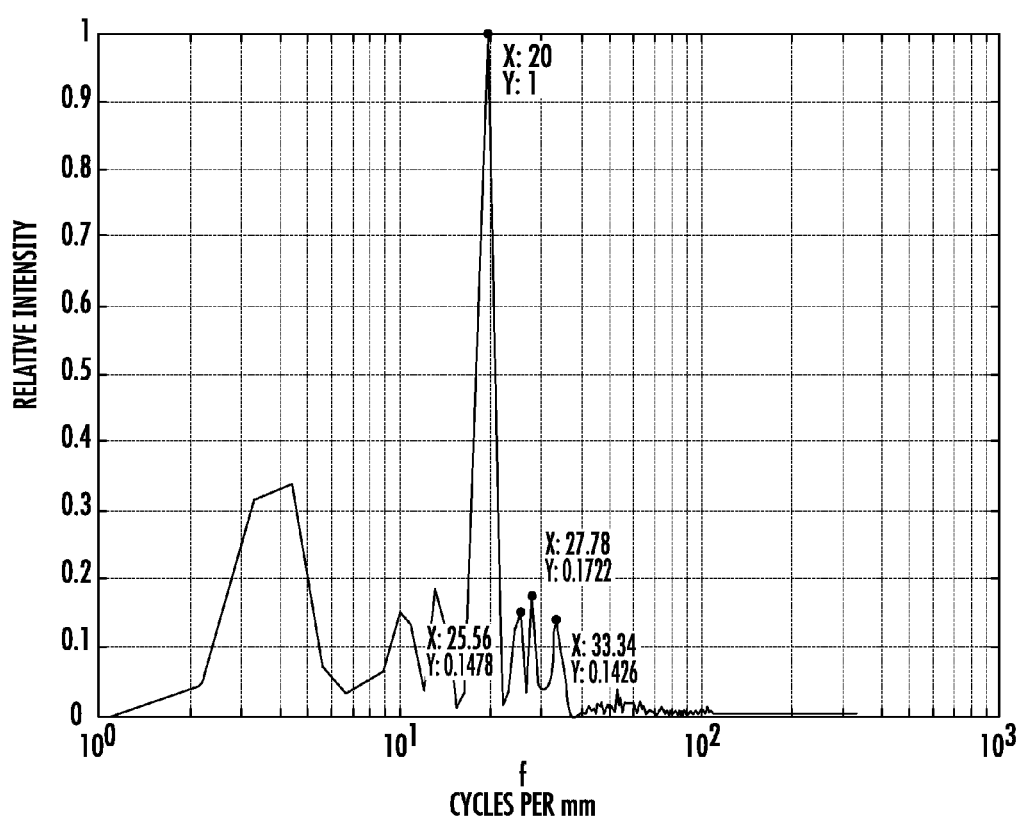
FIG. 5 is a graph of relative power spectral density as a function of spatial frequency (in cycles per mm) for a disclosed roughened surface portion showing a roughness spectrum having a single well-defined peak, according to example embodiment.

FIG. 5 is a graph relative power spectral density (y-axis) as a function of spatial frequency (in cycles per mm) for a disclosed roughened surface portion showing a roughness spectrum having a well-defined peak, according to example embodiments. Such a roughness spectrum is expected to be useful for coupling BAWs to a specific surface-localized mode. The roughened surface portion was generated by a modified lapping process in which a 1D motion was used instead of a traditional rotating motion for the lapping pad. There are peaks shown at 20 cycles/mm, 25.56 cycles/mm, 27.78 cycles/mm and 33.34 cycles/mm. 20 cycles/mm corresponds to a feature periodicity of 50 µm, 25.56 cycles/mm corresponds to a feature periodicity of 39.12 µm, 27.78 cycles/mm corresponds to a feature periodicity of 35.99 am, and 33.34 cycles/mm corresponds to a feature periodicity of 29.99 µm.

Figure 6A:
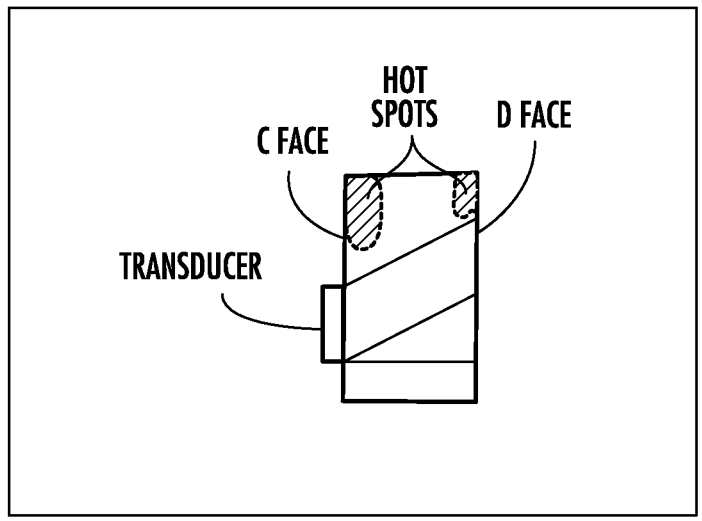
FIGS. 6A-C show thermal camera depictions of an AO crystal with a transducer under applied RF power showing the hot spot (where the acoustic wave is strongly attenuated) moving according to wavelength (or frequency) of the acoustic wave for three (3) different RF wavelengths.
Figure 6B:
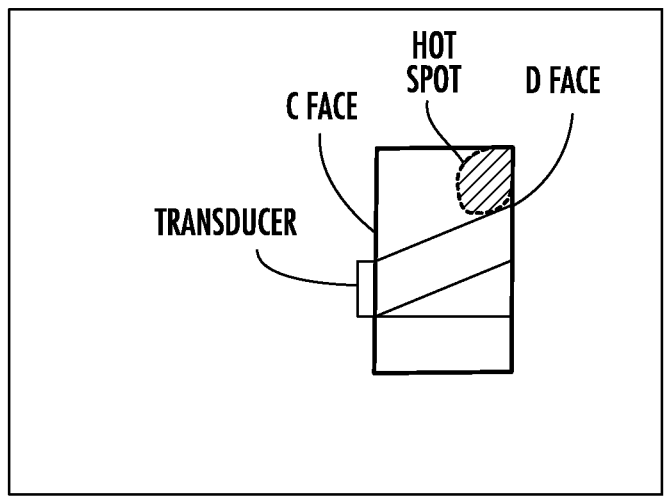
Figure 6C:
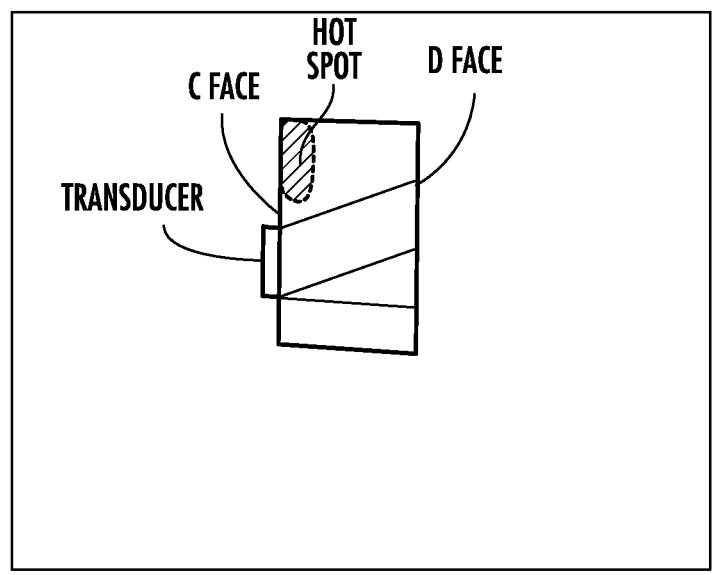

The effect of frequency changes on a 40 µm lapping pad processed AO crystal surface was investigated. In order to verify the presence of the mode conversion mechanism, the frequency of the RF signal was changed from 80 MHz up to 100 MHz and up to 110 MHz, in order to identify the resonance frequencies of the surface, where the mode conversion is more efficient. FIGS. 6A-C show thermal camera-based depictions of an AO crystal with a transducer under applied RF power showing the hot spot (where the acoustic wave is strongly attenuated) is moving according to wavelength (or frequency) of the acoustic wave. FIG. 6B shows that at 80 MHz the BAW is converted to a surface-localized wave with high efficiency because the hotter spot is against the corner of the cell, thus the acoustic wave is hitting the surface, then the mode is converted to an acoustic wave which travels parallel to the surface producing a hot spot in the top right corner on the D face.

Increasing the frequency the acoustic wavelength becomes shorter and the surface-localized wave travelling close to the surface will cross more areas where the periodicity matches the acoustic wavelength, therefore the coupling factor from surface-localized wave to BAW increases to critical limit and part of the surface-localized wave is converted back in to BAW (with energy flowing perpendicular to the surface). As shown in FIG. 6A at 100 MHz two "hot areas" were visible, one close to the D face and one close to the C face.

If the frequency is increased furthermore to 110 MHz, as shown in FIG. 6C then the mode conversion efficiency from surface-localized waves to BAW is increased, thus only one "hot" spot was visible where the acoustic wave is strongly attenuated, on the C face.

In conclusion, a disclosed roughened surface polished with a 1D linear technique shows an unexpected behavior which can be described by acoustic mode conversion from BAW to surface-localized waves and then again to BAW (if the acoustic wavelength is shorter). The results from the thermal camera shown are confirmed by pulse echo measurements. The pulse echo rig essentially does not show the echo coming from the surface because the new BAW generated by the mode conversion at the surface does not hit the active area of the transducer, however, using a Schaefer-Bergmann pattern it is generally possible to visualize the mode of the spurious acoustic wave.

Surface profiler measurement were performed to generate surface profiles of different materials to verify the presence of quasi-periodic structure on surfaces worked using the 1D linear polishing technique compared to a more traditional 2D/rotational technique normally used.

Figure 7:
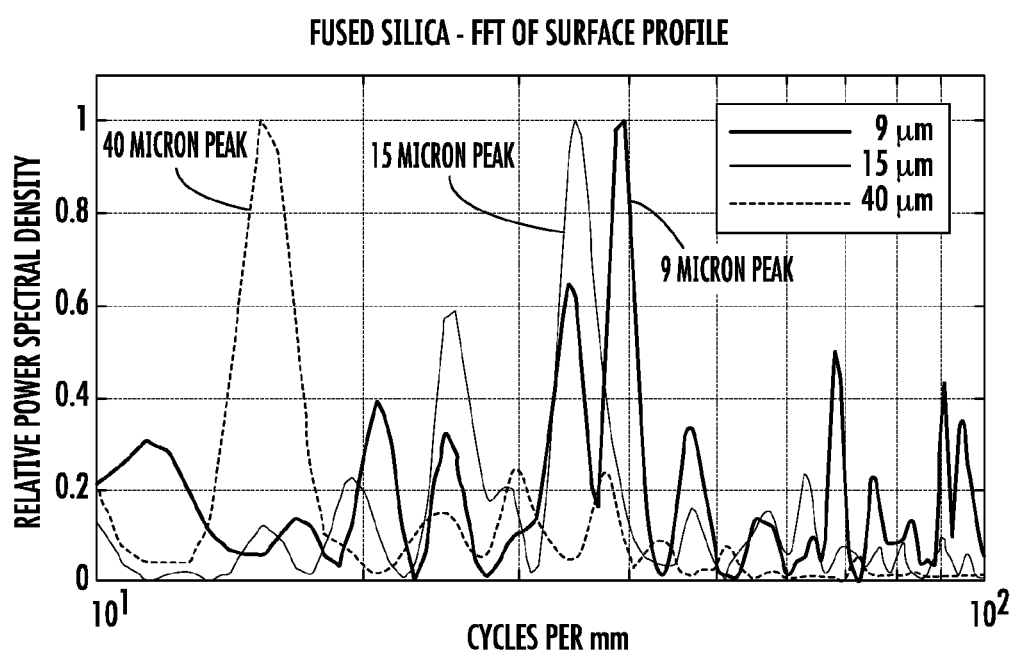
FIG. 7 is a fast Fourier transform (FFT) of a surface profile in cycles per mm for three fused silica samples polished using linear lapping with three different size grits (applying a Hamming window on the FFT).

A significant aspect on the polishing process can be the ratio between force applied and hardness of the material for different lapping pads. In order to compare the results obtained two different materials (fused silica and tellurium dioxide) were worked with lapping pads with different particle size using the 1D linear technique shown as Method B and the 2D/rotational technique shown as Method A in FIGS. 8A and 8B described below. A fused silica block was polished using lapping pad grits with a particle size of: 9 µm, 15 µm, 40 µm and the surface profile obtained measured by a profilometer and the data obtained analyzed by MATLAB routines were used together with fast Fourier transforms (FFTs) to calculate the spatial frequencies of the surface roughness, as shown in cycles per mm in FIG. 7. The spatial frequency of the surface was found to change in accord with the particle size of the lapping pads used. The presence of a noisy process, which can be considered when using 9 µm lapping pads, can lead to higher harmonics and this can explain the position of the peak for 9 µm lapping pads shown in FIG. 7.

Figure 8:
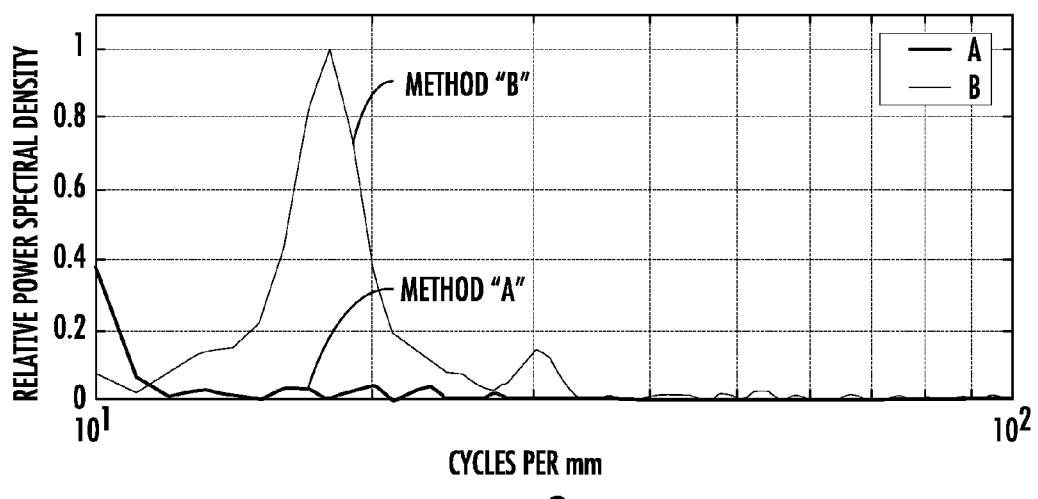
FIG. 8 is a graph of the relative power spectral density as a function of spatial period (in cycles per mm) for a disclosed roughened surface portion for a 1D lapping method (shown as Method B) and a 2D lapping method (shown as method A) showing a roughness spectrum having a significant secondary peak at 18 cycles/mm corresponding to a spatial period of about 55 µm for the sample polished using the 1D method, which is close to the average particle size of the lapping pads used (40 µm).

Tellurium Dioxide samples were also processed. Tellurium dioxide ($TeO_2$) is considerably softer as compared to fused silica therefore the force applied is generally an important aspect of the process. Respective $TeO_2$ substrates were lapped using 1D lapping (shown as Method B) and 2D lapping (shown as Method A) techniques using a lapping pad with particle size of 40 µm, then the surface profile was measured. FIG. 8 is a graph of the relative power spectral density as a function of spatial period (in cycles per mm) for a disclosed roughened surface portion showing a roughness spectrum having a significant secondary peak at about 18 cycles per mm corresponding to a spatial period of about 55 µm for the sample polished using the 1D method (Method B), which is close to the average particle size of the lapping pads used (40 µm).

In conclusion, quasi-periodic surface structures were realized using a particular 1D polishing technique in conjunction of a specific grit size. Only the opposite face 'D' was polished to demonstrate the feasibility and the effects of this process, but this technique can be used on all faces except the optical faces and the transducer faces to increase the dumping of the acoustic wave in AO devices.

Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The invention claimed is:

1. An acousto-optic (AO) device, comprising:
an AO crystal comprising a plurality of faces including a first face and a second face, and
an input transducer having an electrode bonded to said first face (top electrode) for receiving an RF signal and launching bulk acoustic waves (BAWs) configured to interact with an optical beam propagating in said AO crystal, wherein said BAWs are received at least in part by said second face after said interacting with said optical beam,
wherein said second face has a roughened surface portion over an area of at least (≥) 50% of an area of said top electrode, and a root mean square (rms) surface roughness of at least (≥) 1 µm and a surface profile derivable from a Fourier transform which provides at least a first spatial frequency peak from 1 cycle/mm to 300 cycles/mm or at least one band of spatial frequency peaks from 1 cycle/mm to 300 cycles/mm.

2. The AO device of claim 1, wherein said second face is located opposite relative to said first face.

3. The AO device of claim 1, further comprising an acoustic absorber layer on said roughened surface portion.

4. The AO device of claim 1, further comprising a layer of thermally conductive material having an aperture corresponding to where said BAWs are received directly on said roughened surface portion.

5. The AO device of claim 4, wherein said thermally conductive material comprises a metal.

6. The AO device of claim 3, further comprising a layer of thermally conductive material having an aperture corresponding to where said BAWs are received between said acoustic absorber layer and said roughened surface portion.

7. The AO device of claim 1, wherein said first spatial frequency peak is a principal peak that is at least two (2) times higher in amplitude as compared to all other peaks from 1 cycle/mm to 300 cycles/mm.

8. The AO device of claim 7, wherein said first spatial frequency peak is from 10 cycles/mm to 50 cycles/mm.

9. The AO device of claim 1, wherein said AO device includes an input fiber for coupling said optical beam to said AO crystal and an output fiber which receives a first order diffracted beam.

10. The AO device of claim 1, wherein said AO crystal comprise a germanium crystal that includes a V-groove on said second face having said roughened surface portion.

11. A method of surface texturing of an acousto-optic (AO) device, comprising:
calculating at least a first spatial frequency based on (i) a wavelengths of bulk acoustic waves (BAWs) (BAW wavelength) to be used in operating said AO device including an AO crystal comprising a plurality of faces including a first face and a second face, and an input transducer having an electrode bonded to said first face (top electrode) for receiving an RF signal and launching bulk acoustic waves (BAWs) configured to interact with an optical beam propagating in said AO crystal, wherein said BAWs are received at least in part by said second face after said interacting with said optical beam, and texturing said second face so that said second face has a roughened surface portion over an area of at least (≥) 50% of an area of said top electrode, and a root mean square (rms) surface roughness of at least (≥) 1 µm and a periodicity having at least a first spatial frequency peak when expressed as a feature period being from 0.5 to 2.0 times said BAW wavelength.

12. The method of claim 11, wherein said texturing comprises lithography using a mask pattern then etching.

13. The method of claim 11, wherein said texturing comprises machining.

14. The method of claim 13, wherein machining comprises using an abrasive pad having a primary particle size moving across said second face.

15. The method of claim 14, wherein said moving consists of 1-dimensional (1D) movement.

16. The method of claim 11, wherein said second face is located opposite relative to said first face.

17. The method of claim 11, further comprising forming an acoustic absorber layer on said roughened surface portion.

18. The method of claim 11, further comprising forming a layer of thermally conductive material having an aperture corresponding to where said BAWs are received comprising a metal directly on said roughened surface portion.

19. The method of claim 11, wherein said first spatial frequency peak is from 10 cycles/mm to 50 cycles/mm.

20. The method of claim 11, wherein said AO crystal comprise a germanium crystal that includes a V-groove on said second face having said roughened surface portion.

* * * * *